United States Patent
Matsumoto

(10) Patent No.: US 9,690,044 B2
(45) Date of Patent: Jun. 27, 2017

(54) WAVEGUIDE MODE CONVERTER, POLARIZATION BEAM SPLITTER, AND OPTICAL DEVICE

(71) Applicant: NEC Corporation, Tokyo (JP)

(72) Inventor: Takashi Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/895,612

(22) PCT Filed: Jan. 29, 2014

(86) PCT No.: PCT/JP2014/000447
§ 371 (c)(1),
(2) Date: Dec. 3, 2015

(87) PCT Pub. No.: WO2014/196103
PCT Pub. Date: Dec. 11, 2014

(65) Prior Publication Data
US 2016/0131836 A1 May 12, 2016

(30) Foreign Application Priority Data
Jun. 7, 2013 (JP) ................................. 2013-120744

(51) Int. Cl.
*G02B 6/12* (2006.01)
*G02B 6/126* (2006.01)
(Continued)

(52) U.S. Cl.
CPC ............. *G02B 6/1228* (2013.01); *G02B 6/14* (2013.01); *G02B 6/274* (2013.01); *G02B 6/2938* (2013.01);
(Continued)

(58) Field of Classification Search
CPC .................................................... G02B 6/1228
See application file for complete search history.

(56) References Cited

U.S. PATENT DOCUMENTS

| | | | |
|---|---|---|---|
| 6,853,775 B2* | 2/2005 | Payne | G02B 6/1228 385/43 |
| 7,251,406 B2* | 7/2007 | Luo | G02B 6/1228 385/129 |

(Continued)

FOREIGN PATENT DOCUMENTS

| | | |
|---|---|---|
| JP | 2003-222748 | 8/2003 |
| JP | 2004-151700 | 5/2004 |

(Continued)

OTHER PUBLICATIONS

D. Dai et al., "Compact Polarization Beam Splitter Using an Asymmetrical Mach-Zehnder Interferometer Based on Silicon-on-Insulator Waveguides", IEEE Phototonics Technology Letters, vol. 24, No. 8, pp. 673-675, Apr. 2012.

(Continued)

*Primary Examiner* — Michelle R Connelly
(74) *Attorney, Agent, or Firm* — Finnegan, Henderson, Farabow, Garrett & Dunner, L.L.P.

(57) ABSTRACT

Provided is a waveguide mode converter (30) that converts a waveguide mode and that is placed in a transition area (connection section) (43) of a rib-type waveguide (50) and a channel-type waveguide (51). The rib-type waveguide (50) has a tapered section (23b). The tapered section (23b) constitutes a core layer (23) that extends on both sides of a rib (23a) and has a width (Wt) that changes gradually in a direction that is vertical to the waveguide direction.

6 Claims, 9 Drawing Sheets

(51) Int. Cl.
  *G02B 6/122* (2006.01)
  *G02B 6/14* (2006.01)
  *G02B 6/27* (2006.01)
  *G02B 6/293* (2006.01)
(52) U.S. Cl.
  CPC .... *G02B 6/29355* (2013.01); *G02B 2006/121* (2013.01); *G02B 2006/12097* (2013.01)

(56) References Cited

U.S. PATENT DOCUMENTS

| | | | |
|---|---|---|---|
| 2004/0057667 A1 | 3/2004 | Yamada et al. | |
| 2009/0297093 A1* | 12/2009 | Webster | G02B 6/1228 385/14 |
| 2011/0170825 A1* | 7/2011 | Spector | G02B 6/136 385/43 |
| 2011/0205660 A1* | 8/2011 | Komura | B82Y 20/00 360/59 |
| 2012/0156369 A1* | 6/2012 | Kim | G02B 6/12002 427/163.2 |
| 2012/0207424 A1* | 8/2012 | Zheng | G02B 6/1228 385/2 |
| 2012/0321244 A1* | 12/2012 | Suzuki | G02B 6/305 385/14 |

FOREIGN PATENT DOCUMENTS

| | | |
|---|---|---|
| JP | 2006-517673 | 7/2006 |
| JP | 2007-256510 | 10/2007 |
| JP | 2011-258785 | 12/2011 |

OTHER PUBLICATIONS

Y. Hashizume et al., "Integrated polarization beam splitter using waveguide birefringence dependence on waveguide core width", Electronics Letters, vol. 37, No. 25, pp. 1517-1518, Dec. 2001.
International Search Report and Written Opinion mailed Mar. 4, 2014 in corresponding PCT International Application.

* cited by examiner

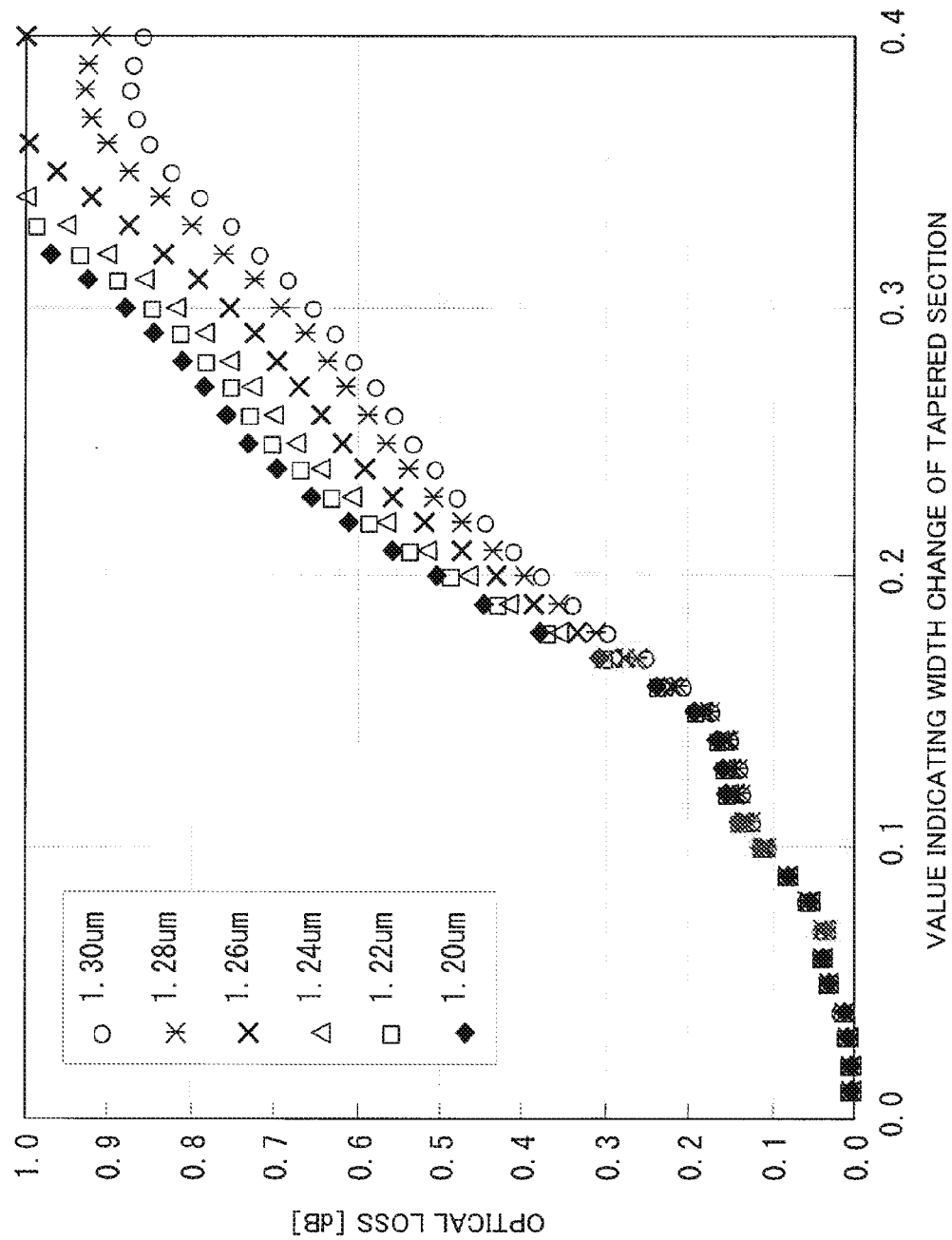

WAVEGUIDE MODE CONVERTER, POLARIZATION BEAM SPLITTER, AND OPTICAL DEVICE

CROSS-REFERENCE TO RELATED PATENT APPLICATIONS

This application is a National Stage Entry of International Application No. PCT/JP2014/000447, filed Jan. 29, 2014, which claims priority from Japanese Patent Application No. 2013-120744, filed Jun. 7, 2013. The entire contents of the above-referenced applications are expressly incorporated herein by reference.

TECHNICAL FIELD

The present invention relates to a waveguide mode converter, a polarization beam splitter and an optical device.

BACKGROUND ART

Recently, a transmission method for optical communication has been changed significantly. The transmission method is changed from the IM-DD (Intensity Modulation-Direct Detection) method, which has been the main detection method, to the coherent detection method such as QPSK (Quadrature Phase Shift Keying) or the like. Among the coherent detection methods, the DP-QPSK (Dual Polarization-Quadrature Phase Shift Keying) method, in which signals are carried by the orthogonal polarization and the phase, has been researched and developed as a transmission method for realizing high speed transmission whose speed is as high as or higher than 40 Gbps, and a product using the DP-QPSK method has been shipped locally.

The DP-QPSK method uses a coherent receiver as a main component. The coherent receiver includes a PLC (Planer Lightwave Circuit)-type optical coherent mixer, PBS (Polarization Beam Splitter), PD (Photo Detector), TIA (Trans Impedance Amplifier) or the like. These components are shipped by many device venders. For example, PTL 1 discloses a polarization beam splitter using SiO2.

Moreover, PTL 2 discloses an optical device which includes the single mode waveguide.

As a future prospect, a small size coherent receiver, which is called Generation 2 according to MSA (Multi Source Agreement), has been studied. It is necessary to make PLC, which is included in the small size coherent receiver, miniaturized furthermore. The most attractive art is Si photonics which makes Si a main material of an optical waveguide. According to the Si photonics, it is expected to realize a small bend radius by a strong light confinement which is generated by a large difference between refractive indexes of Si and $SiO_2$. Furthermore, according to the Si photonics, it is expected to realize PD integration using Ge, PBS integration by a large structural birefringence.

CITATION LIST

Patent Literature

[PTL 1] Japanese Patent Application Laid-Open Publication No. 2003-222748

[PTL 2] Japanese Patent Application Laid-Open Publication (Translation of PCT Application) No. 2006-517673

SUMMARY OF INVENTION

Technical Problem

While it is expected according to the Si photonics to realize the small bend radius by the strong light confinement which is generated by the large difference between the refractive indexes of Si and $SiO_2$, the single mode condition requires smallness like several hundreds nm in the case of a rectangular waveguide. Therefore, the Si photonics has a problem that process is difficult. As a result, there is a problem that characteristics of PBS are degraded due to deviation of a waveguide width.

The optical device, which is described in PTL 2, has a problem that it is difficult to manufacture the optical device since the optical device has a complex shape that a thickness of the waveguide is changed in a waveguide direction of the waveguide. Moreover, PTL 2 describes that the optical device guides the single mode light, but does not describe that the optical device guides the multi-mode light.

An object of the present invention is to provide a waveguide mode converter, a polarization beam splitter and an optical device which can make characteristic degradation of the polarization beam splitter less.

Solution to Problem

A waveguide mode converter according to a first exemplary embodiment of the present invention is a waveguide mode converter which converts a waveguide mode. Moreover, the waveguide mode converter is placed in a connection section of a rib-type waveguide and a channel-type waveguide. Moreover, the waveguide mode converter is a rib-type waveguide which includes a tapered section. Then, the tapered section is a core layer which extends on both sides of a rib, and a width of the tapered section changes gradually in a direction which is vertical to a waveguide direction.

A polarization beam splitter according to a second exemplary embodiment of the present invention includes an optical demultiplexer, an optical multiplexer, a first arm waveguide and a second arm waveguide. Moreover, the optical demultiplexer is formed by a rib-type waveguide, and demultiplexes an input light into a first input light and a second input light. Meanwhile, the optical multiplexer is formed by the rib-type waveguide, and multiplexes the first input light and the second input light, which are demultiplexed by the optical demultiplexer. Moreover, the first arm waveguide is formed by a channel-type waveguide at least partially, and guides the first input light to the optical multiplexer. Meanwhile, the second arm waveguide is formed by the channel-type waveguide at least partially, and guides the second input light, which is caused a phase difference between the first input light propagated on the first arm waveguide and the second input light, to the optical multiplexer. Moreover, the above mentioned waveguide mode converter is arranged in a connection section of the rib-type waveguide and the channel-type waveguide.

An optical device according to a third exemplary embodiment of the present invention includes the above-mentioned polarization beam splitter. Moreover, a plurality of the polarization beam splitters is connected in a form of multi-step.

Advantageous Effects of Invention

According to the present invention, it is possible to provide the waveguide mode converter, the polarization beam splitter and the optical device which can make characteristic degradation of the polarization beam splitter less.

BRIEF DESCRIPTION OF DRAWINGS

FIG. 10 is a graph showing a relation between an optical loss and a value which indicates a width change of a tapered section of a rib-type waveguide coupled with a rib-type waveguide which includes a core layer having a sufficient width.

DESCRIPTION OF EMBODIMENTS

Figure 1:
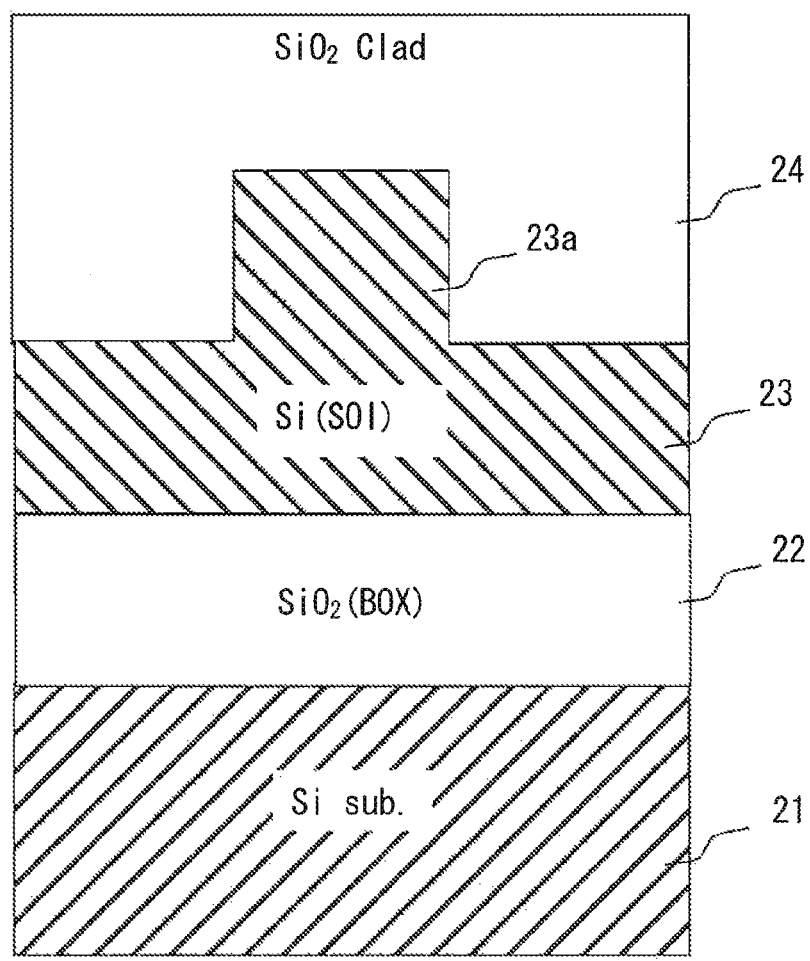
FIG. 1 is a cross section view of a rib-type waveguide.

An exemplary embodiment of the present invention will be explained in the following with reference to an attached drawing. The exemplary embodiment explained in the following is an example of the present invention, and the present invention is not limited to the exemplary embodiment explained in the following. Here, it is assumed that components, which have the same code in Description and the drawing, are identical each other.

Exemplary Embodiment 1

Figure 2:
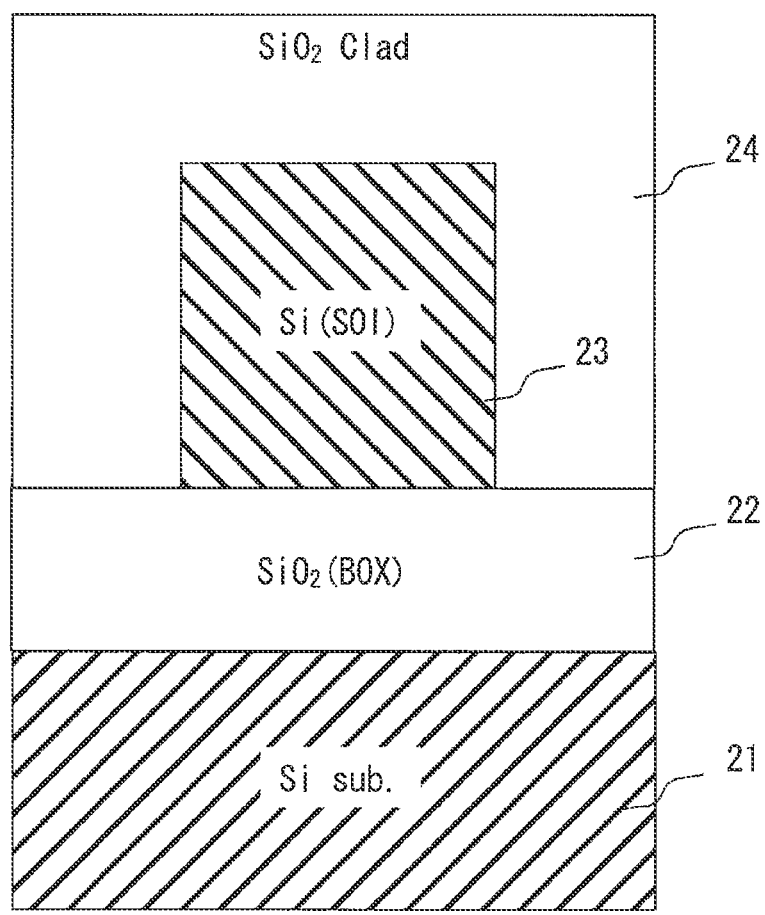
FIG. 2 is a cross section view of a channel-type waveguide.

A polarization beam splitter (PBS) 1 according to the exemplary embodiment 1 includes a Si waveguide. In the case of the Si waveguide, it is possible to make the relative refractive-index difference between a core and a clad large. Therefore, it is possible to make the small bend radius in comparison with a silica waveguide. The Si waveguide includes both of rib-type structure and channel-type structure. FIG. 1 is a cross section view of a usual Si waveguide having the rib-type structure (hereinafter, denoted as a rib-type waveguide), and FIG. 2 is a cross section view of a usual Si waveguide having the channel-type structure (hereinafter, denoted as a channel-type waveguide).

Each of a channel-type waveguide 51 and a rib-type waveguide 50 includes a substrate 21, a lower-layered clad layer 22, a core layer 23 and an upper-layered clad layer 24. The lower-layered clad layer 22 is arranged on the substrate 21 which is a Si substrate. Here, the lower-layered clad layer 22 is a $SiO_2$ film, and is formed, for example, by use of the buried oxide film (BOX). The core layer 23 is arranged on the lower-layered clad layer 22. The core layer 23 is a Si film such as SOI (Silicon On Insulator) or the like. The upper-layered clad layer 24 is arranged on the core layer 23. The upper-layered clad layer 24 is, for example, a $SiO_2$ film. The core layer 23 is made of material whose refractive index is different from ones of the lower-layered clad layer 22 and the upper-layered clad layer 24.

With reference to the cross section view of the rib-type structure, the core layer 23 includes a rib 23a which projects upward. Both sides of the rib 23a are covered with the upper-layered clad layer 24. In the case of the rib-type structure, a thickness is diversified from about 1 µm to 3 µm. While the bend radius is about 200 µm which is not so small as one of the channel-type structure, a propagation loss is 0.5 to 1.0 dB/cm which is smaller than one of the channel-type structure. Since sufficiently good characteristics are acquired by use of the stepper exposure when manufacturing the waveguide, high productivity is achieved in comparison with a case of forming the waveguide by use of the EB exposure.

In the case of the channel-type structure, a cross section of the core layer 23, which forms the waveguide, has an almost rectangular shape. Moreover, the core layer 23 is covered with the upper-layered clad layer 24. A whole of the core layer 23 is covered with the lower-layered clad layer 22 and the upper-layered clad layer 24. The polarization beam splitter (PBS) 1 according to the exemplary embodiment 1 includes both of the channel-type waveguide 51 and the rib-type waveguide 50.

The polarization beam splitter 1 according to the exemplary embodiment 1 is applied to a coherent mixer device (optical device). The coherent mixer device is, for example, a planer lightwave circuit (PLC), and includes a polarization beam splitter (PBS), and a 90°-optical hybrid (90°-OH). The polarization beam splitter is a circuit which has a polarization splitting function. The polarization beam splitter splits an input light into linear polarization components which are orthogonal each other, and outputs the linear polarization components. The polarization beam splitter is, for example, the Mach-Zehnder type interferometer which uses the birefringence of an arm waveguide. The 90° optical hybrid is a circuit (coherent mixer circuit) which has a function of extracting phase information.

Figure 3:
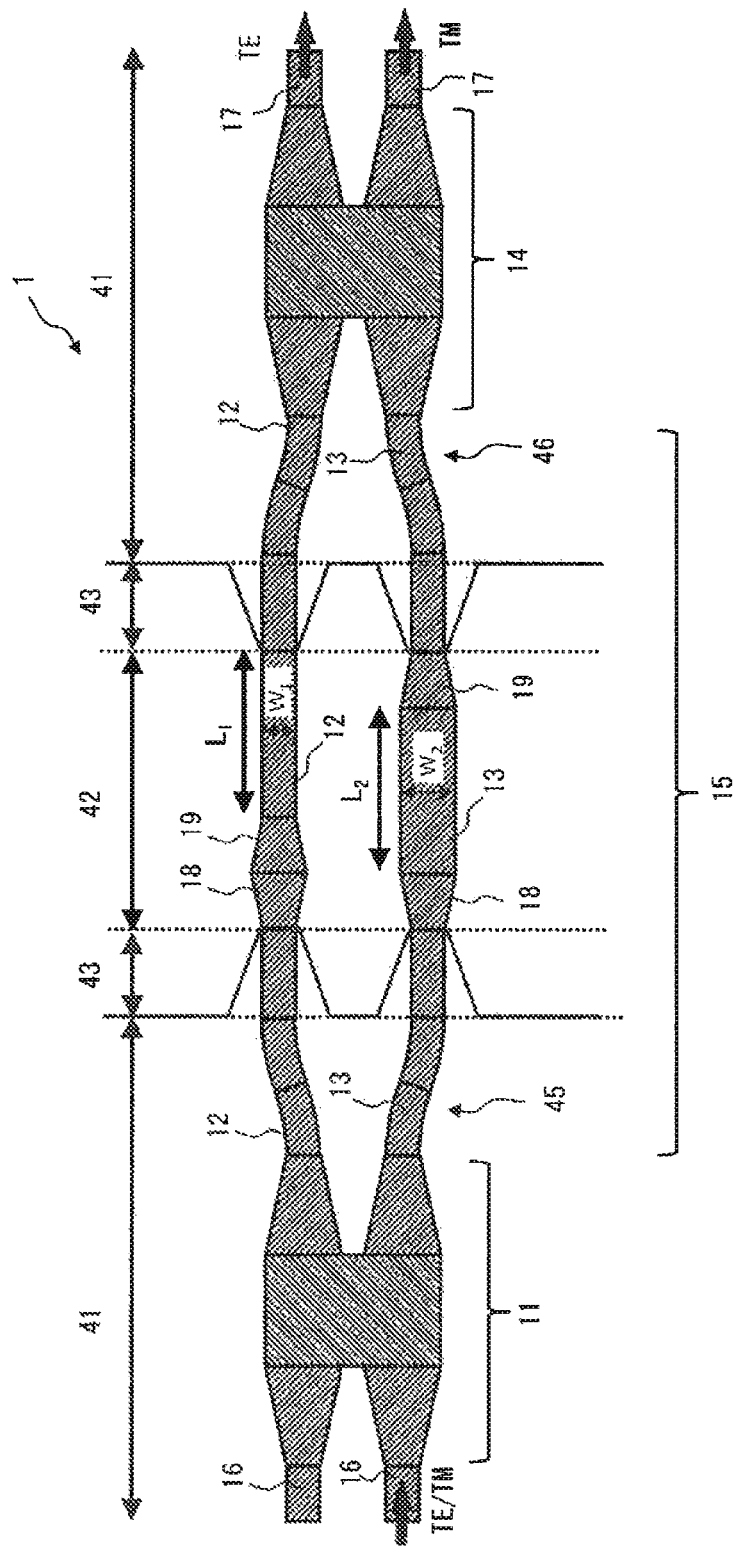
FIG. 3 is a schematic view showing whole structure of a polarization beam splitter according to an exemplary embodiment 1 of the present invention.

FIG. 3 is a schematic view showing whole structure of the polarization beam splitter 1 according to the exemplary embodiment 1. The polarization beam splitter 1 is a Mach-Zehnder type polarization beam splitter which is monolithically integrated inside the coherent mixer device.

As shown in FIG. 3, the polarization beam splitter 1 includes an optical demultiplexer 11, an optical multiplexer 14, an arm section 15, an input side waveguide 16 and an output side waveguide 17. The arm section 15 includes a first arm waveguide 12 and a second arm waveguide 13. The arm section 15 is arranged between the optical demultiplexer 11 and the optical multiplexer 14. The arm section 15 constitutes the Mach-Zehnder interferometer. Each of the optical demultiplexer 11 and the optical multiplexer 14 is, for example, a MMI (Multi-Mode Interference) coupler. Moreover, each of the optical demultiplexer 11 and the optical multiplexer 14 is a coupler which has two input ports and two output ports. For example, each of the optical demultiplexer 11 and the optical multiplexer 14 is a 3 dB coupler. Here, it is possible to use a directional coupler, a Y type branch or the like as the optical demultiplexer 11 and the optical multiplexer 14.

The optical demultiplexer 11 is coupled with the input side waveguide 16 to split an input light to a first input light and a second input light. For example, the optical demultiplexer 11 splits the signal light in a ratio of 50:50 to generate the first input light and the second input light. The optical demultiplexer 11 is coupled with the first arm waveguide 12 and the second arm waveguide 13. The first input light, to which the optical demultiplexer 11 splits the input light, is propagated on the first arm waveguide 12. The second input light, to which the optical demultiplexer 11 splits the input light, is propagated on the second arm waveguide 13. Each of the first arm waveguide 12 and the second arm waveguide 13 is coupled with the optical multiplexer 14. The first arm waveguide 12 guides the first input light to the optical multiplexer 14, and the second arm waveguide 13 guides the second input light to the optical multiplexer 14.

The optical multiplexer 14 multiplexes the first input light which is propagated in the first arm waveguide 12, and the second input light which is propagated in the second arm waveguide 13. The optical multiplexer 14 is coupled with two output side waveguides 17. The optical multiplexer 14 outputs a TE (Transverse Electric) polarization light to one output side waveguide 17, and outputs a TM (Transverse Magnetic) polarization light to the other output side waveguide 17. As a result, the polarization beam splitter 1 splits the polarization of the input light. The polarization beam splitter 1 splits the input light to the TE polarization light and the TM polarization light which are linear polarization components orthogonal each other, and outputs the TE polarization light and the TM polarization light.

Each of the optical demultiplexer 11 and the optical multiplexer 14 includes a rib-type Si waveguide (rib-type waveguide 50). Moreover, the arm section 15 includes a channel-type Si waveguide (channel-type waveguide 51) at least partially. That is, the channel-type waveguide 51 is arranged between the rib-type waveguides 50. In the case of the channel-type waveguide, it is unnecessary to regard a rib height as a variation factor from a structural point of view. As a result of calculation, it is found that a thickness of a core Si layer (core layer 23) has a small influence on an optical loss of the input light. As a result, it is possible to realize the polarization beam splitter 1, which has high productivity, by applying the rib-type waveguide to both of the arm waveguides 12 and 13.

The polarization beam splitter 1 includes the channel-type waveguide 51 and the rib-type waveguide 50. Hereinafter, an area in which the channel-type waveguide 51 and the rib-type waveguide 50 are arranged will be explained in detail. As shown in FIG. 3, the polarization beam splitter 1 has a rib-type area 41, a channel-type area 42 and a transition area 43. The rib-type waveguide 50 shown in FIG. 1 is arranged in the rib-type area 41. The channel-type waveguide 51 shown in FIG. 2 is arranged in the channel-type area 42. The transition area 43 is an area which exists between the rib-type waveguide 50 and the channel-type waveguide 51.

The optical demultiplexer 11 and the optical multiplexer 14 are arranged in the rib area 41. An input side and an output side of the arm section 15 are included in the rib-type area 41. For example, a fan-out 45 in which a distance between the first arm waveguide 12 and the second arm waveguide 13 becomes long gradually, and a fan-in 46 in which the distance becomes short gradually are included in the rib-type area 41. A part of the arm section 15 is arranged in the channel-type area 42. The arm section 15 which exists between the channel-type area 42 and the rib-type area 41 is included in the transition area 43.

As mentioned above, the first arm waveguide 12 is formed by the channel-type waveguide 51 at least partially. The first arm waveguide 12 guides the first light to the optical multiplexer 14. Furthermore, the second arm waveguide 13 is formed by the channel-type waveguide 51 at least partially. The second arm waveguide 13 guides the second input light, which is caused a phase difference between the first input light propagated on the first arm waveguide 12 and the second input light, to the optical multiplexer 14.

Figure 4:
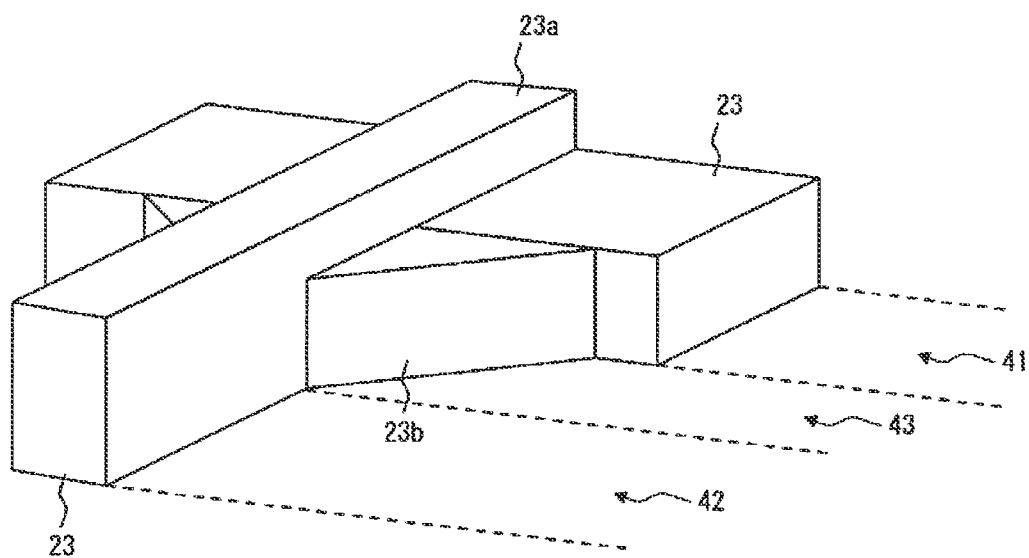
FIG. 4 is a perspective view showing a waveguide mode converter according to the exemplary embodiment 1 of the present invention.

A waveguide mode converter 30 according to the exemplary embodiment 1 is arranged in the transition area 43. The waveguide mode converter 30 according to the exemplary embodiment 1 will be explained in the following with reference to FIG. 4. FIG. 4 is a perspective view showing the transition area 43 according to the exemplary embodiment 1. As shown in FIG. 4, the transition area 43 exists between the rib-type area 41 and the channel type area 42. Moreover, the waveguide mode converter 30 is the rib-type waveguide 50 which includes a tapered section 23b. In other words, the waveguide mode converter 30 includes the core layer 23 which has the rib 23a and the tapered section 23b.

Moreover, as shown in FIG. 4, the core layer 23, which includes the rib 23a, is arranged in the rib-type area 41. At the waveguide mode converter 30 of the transition area 43, and in the rib-type area 41, the rib 23a projects above another portion of the core layer 23. Moreover, the core layer 23 of the channel-type area 42 is as high as the rib 23a of the waveguide mode converter 30 of the transition area 43, and the rib 23a of the rib-type area 41. That is, a thickness of the core layer 23, which includes the rib 23a, at the waveguide mode converter 30 of the transition area 43 and in the rib-type area 41 are almost equal to a thickness of the core layer 23 of the channel-type area 42. Moreover, a width of the core layer 23 of the channel-type area 42 is almost equal to a width of the rib 23a at the waveguide mode converter 30 of the transition area 43 and in the rib-type area 41.

The tapered sections 23b of the waveguide mode converter 30 are the core layer 23 which extends on both sides of the rib 23a. Each of the widths of the tapered sections 23b changes gradually in a direction which is vertical to a waveguide direction. More specifically, the width of the tapered section 23b in the direction, which is vertical to the waveguide direction, becomes narrow gradually in a direction from the rib-type area 41 toward the channel-type area 42. In other words, a boundary surface between the core layer 23 and the clad layer 24 at the waveguide mode converter 30 is in a shape of taper. Moreover, a height of the tapered section 23b is almost equal to a height of the core layer 23, which excludes the rib 23a, in the rib-type area 41. A thickness of the tapered section 23b of the waveguide mode converter 30 is almost equal to a thickness of the core layer 23, which excludes the rib 23a, in the rib-type area 41. In other words, the height of the tapered section 23b is lower than a height of the core layer 23 of the channel-type area 42. Since the light confinement of the rib-type waveguide 50 and the channel-type waveguide 51 are different each other, the optical loss is caused if the rib area 41 and the channel area 42 are not connected smoothly. Therefore, the waveguide mode converter 30 is arranged in the transition area 43 which exists between the rib area 41 and the channel area 42.

Furthermore, the width of the tapered section 23b of the waveguide mode converter 30 becomes narrow as gradually as possible. As a result, the waveguide converter 30 converts a shape of the core layer 23 of the transition area 43 into the channel type from the rib type.

Moreover, it is desirable that a width Wr of the core layer 23, which includes the tapered section 23b, in the direction vertical to the waveguide direction is three times as large as or larger than the width of the rib 23a.

Here, it is assumed that a value indicating a width change of the tapered section 23b is denoted as Ts, and the width of the core layer 23, which includes the tapered section 23b, in the direction vertical to the waveguide direction is denoted as Wr, and a width of the waveguide (width of the core layer 23 of the channel-type waveguide 51) is denoted as Ww, and a value of (Wr−Ww)/Lt is denoted as Ts. In this case, it is desirable that Ts, which indicates the width change of the tapered section 23b, is smaller than 0.1.

By setting the width Wr of the core layer 23, which includes the tapered section 23b, in the direction vertical to the waveguide direction, and Ts indicating the width change of the tapered section 23b so as to be within the above-mentioned ranges respectively, it is possible to surely reduce an optical loss which is generated when guiding the input light from the rib area 41 to the channel area 42 or from the channel area 42 to the rib area 41 at the waveguide mode converter 30.

Figure 5:
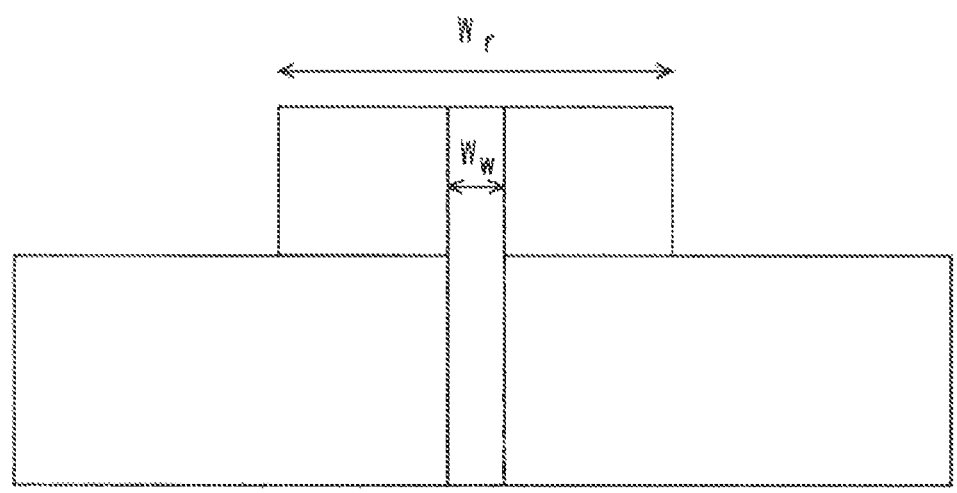
FIG. 5 is a diagram showing a model used for calculating an optical loss which is generated in the case that a rib-type waveguide, which includes a core layer having a limited width, is coupled with a rib-type waveguide which includes a core layer having a sufficient width.
Figure 6:
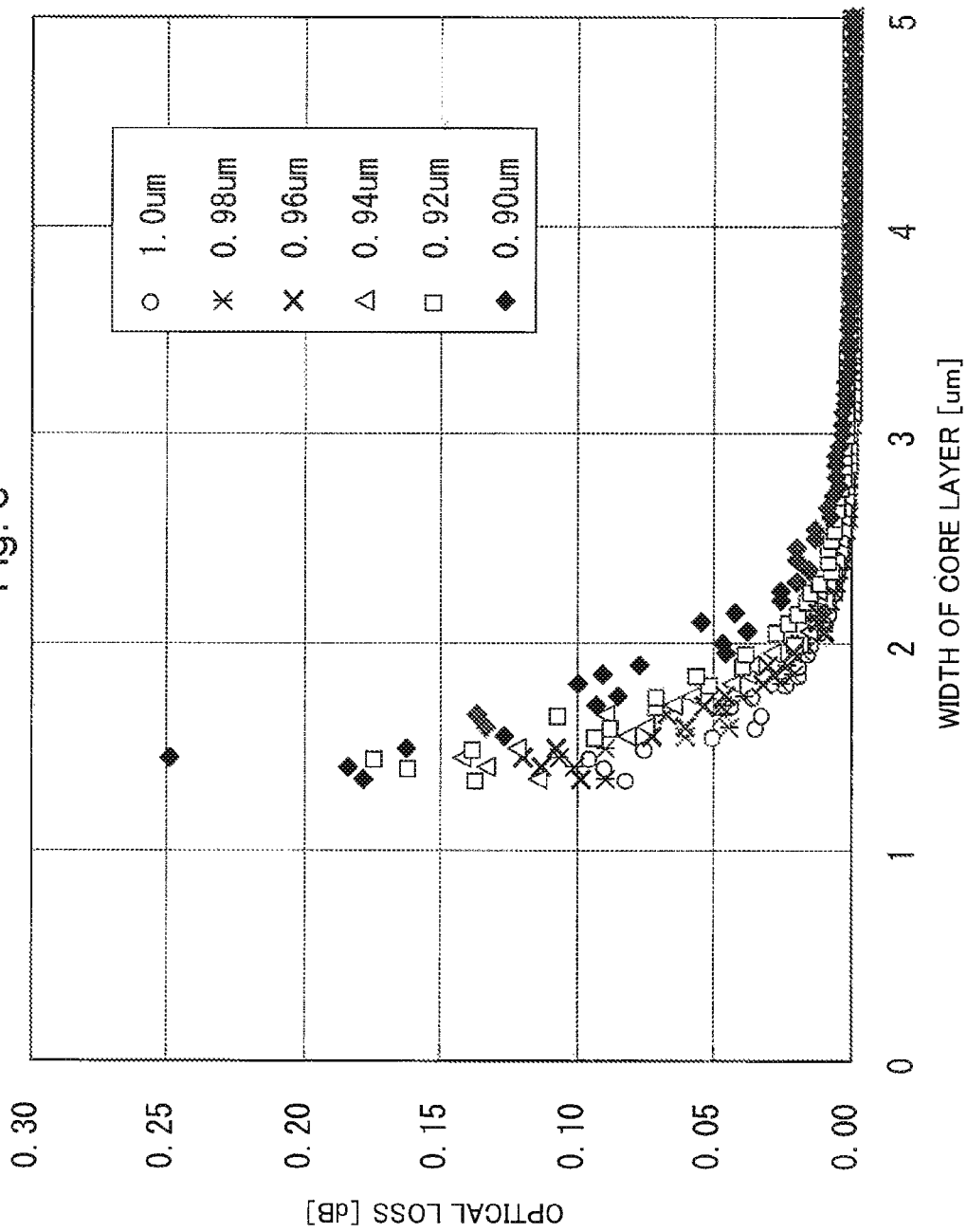
FIG. 6 is a graph showing a relation between an optical loss and a width of a core layer of a rib-type waveguide coupled with a rib-type waveguide which includes a core layer having a sufficient width.

Next, the optical loss generated at the waveguide mode converter 30 will be explained. Firstly, an optical loss, which is generated in the case that, as shown in FIG. 5, the rib-type waveguide 50 including the core layer 23 having a limited width is coupled with the rib-type waveguide 50 including the core layer 23 having a sufficient width, will be calculated. It is assumed that the width of the core layer 23 having the limited width is denoted as Wr as shown in FIG. 5. On the condition that a wave length of the input light is 1.55 μm, and the waveguide width (width of the core layer 23 of the channel-type waveguide 51) Ww is 1.35 μm, and the height of the core layer 23 including the rib 23a is 1.5 μm, and the height of the rib 23a projecting above another portion of the core layer 23 (hereinafter, denoted as 'rib height') is 0.9 μm to 1.0 μm, the optical loss is calculated. The reason why the value of rib height has the range is that a central design value (that is, 0.925 μm) of the rib height requires a tolerance of 0.05 μm as manufacturing variation. A calculation result is shown in FIG. 6. In FIG. 6, the vertical axis indicates the optical loss in [dB], and the horizontal axis indicates the width Wr of the core layer 23 which has the limited width, and marks ○, *, ×, Δ, □, and ◆ indicate cases of the rib height 1.0 μm, the rib height 0.98 μm, the rib height 0.96 μm, the rib height 0.94 μm, the rib height 0.92 μm, and the rib height 0.90 μm respectively.

It is found from FIG. 6 that the optical loss is almost zero in the case that the width Wr of the core layer 23 having the limited width is equal to or longer than about 3.5 μm. Moreover, the highest optical loss is shown in the case that the rib height is 0.9 μm. The reason is that, since a component of the input light, which leaks out into a portion of the core layer 23 other than the rib 23a, increases as the rib height becomes low, the optical loss is sensitive to a change in the width of the waveguide (change in the width Wr). Moreover, if the optical loss of about 0.1 [dB] is acceptable, the width Wr of the core layer 23 having the limited width may be equal to or larger than 1.8 μm.

Figure 7:
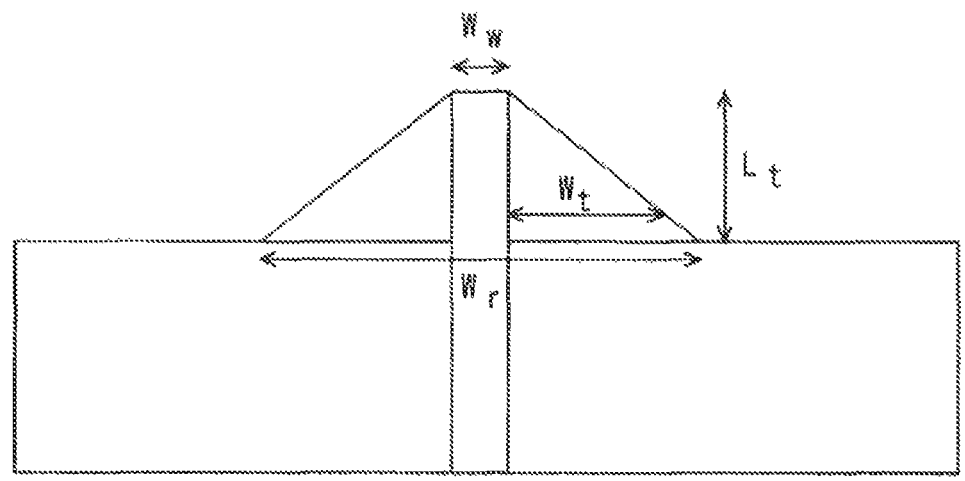
FIG. 7 is a diagram showing a model used for calculating an optical loss which is generated in the case that a rib-type waveguide, which includes a core layer having a tapered section, is coupled with a rib-type waveguide which includes a core layer having a sufficient width.
Figure 8:
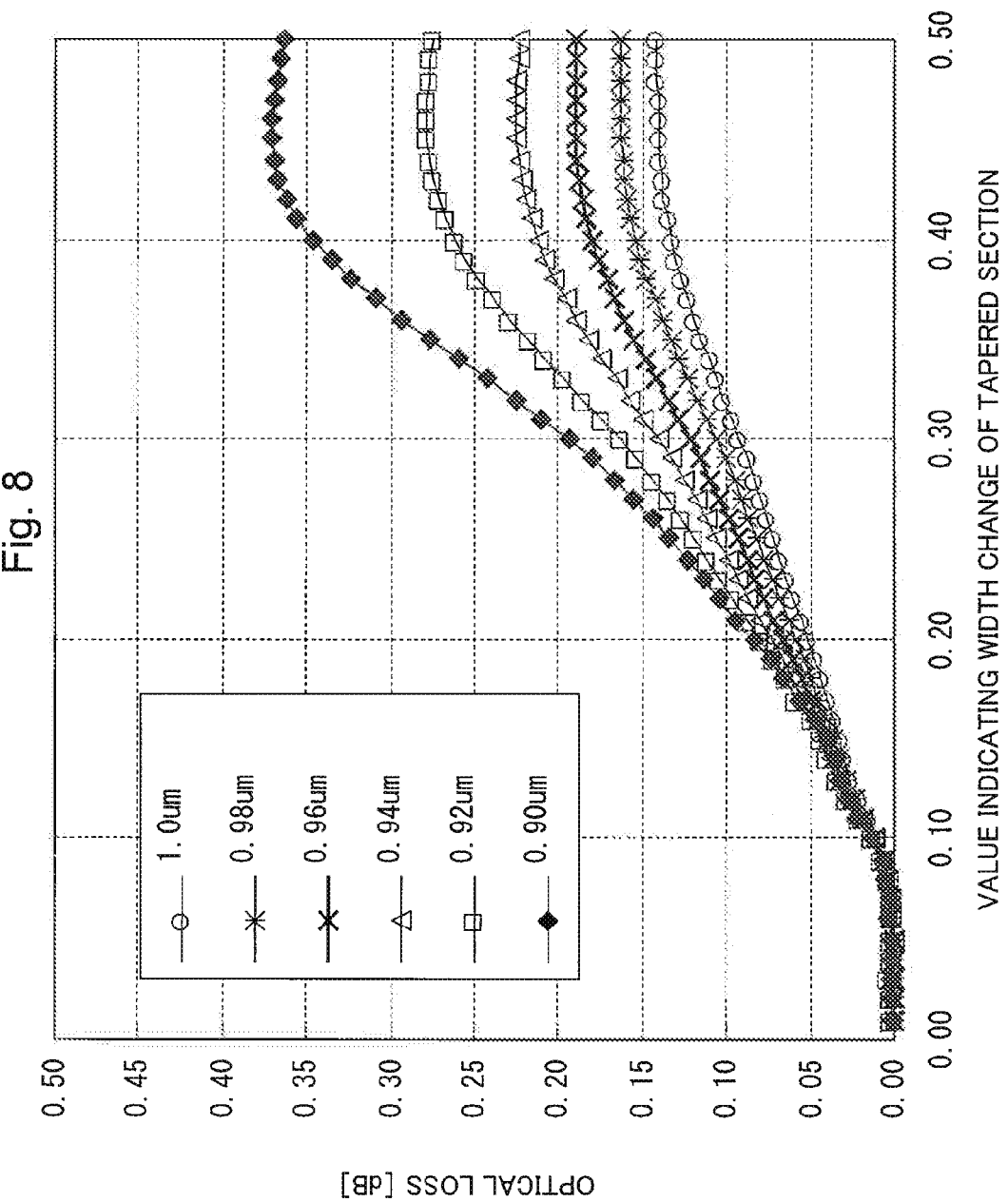
FIG. 8 is a graph showing a relation between an optical loss and a value which indicates a width change of a tapered section of a rib-type waveguide coupled with a rib-type waveguide which includes a core layer having a sufficient width.

Next, an optical loss, which is generated in the case that, as shown in FIG. 7, the rib-type waveguide 50 (waveguide mode converter 30) including the core layer 23 having the tapered section 23b is coupled with the rib-type waveguide 50 which includes the core layer 23 having a sufficient width, will be calculated. As shown in FIG. 7, a width of the core layer 23 having the tapered section 23b is denoted as Wr, and a waveguide width (width of the core layer 23 of the channel-type waveguide 51) is denoted as Ww, and a length of the tapered section 23B is denoted as Lt, and a value indicating a width change of the tapered section 23b is denoted as Ts. Then, Ts is expressed as (Wr−Ww)/Lt. As the value Ts indicating the width change of the tapered section 23b becomes small, the length Lt of the tapered section 23b becomes long, and consequently a width Wt of the tapered section 23b changes gradually. A calculation result on the condition that Wr is 3.5 μm is shown in FIG. 8. Other calculation conditions are the same as ones shown in FIG. 5 and FIG. 6. In FIG. 8, the vertical axis indicates the optical loss in [dB], and the horizontal axis indicates the value Ts indicating the width change of the tapered section 23b, and marks ○, *, ×, Δ, □, and ◆ indicate cases of the rib height 1.0 μm, the rib height 0.98 μm, the rib height 0.96 μm, the rib height 0.94 μm, the rib height 0.92 μm, and the rib height 0.90 μm respectively.

Also in FIG. 8, similarly to the case shown in FIG. 6, the highest optical loss is shown in the case that the rib height is 0.9 μm. It is found from FIG. 8 that, if the value Ts indicating the width change of the tapered section 23b is equal to or smaller than 0.22, the optical loss is equal to or smaller than 0.1 [dB]. If the value Ts indicating the width change of the tapered section 23b is equal to or smaller than 0.22, even when the rib height is 0.9 μm, the optical loss is equal to or smaller than 0.1 [dB]. As a result, it is possible to realize the waveguide mode converter 30 which has sufficient tolerance against the manufacturing variation.

Figure 9:
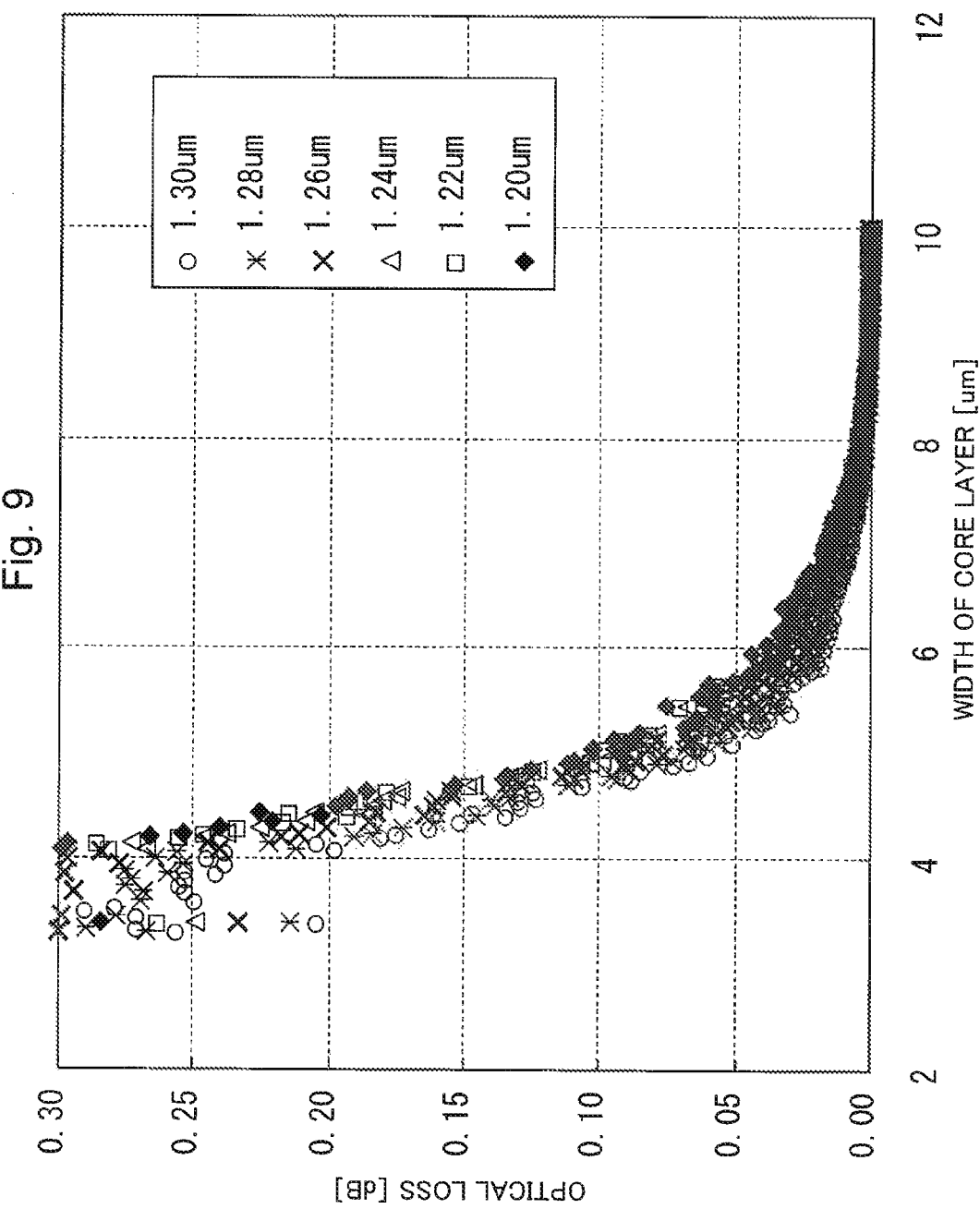
FIG. 9 is a graph showing a relation between an optical loss and a width of a core layer of a rib-type waveguide coupled with a rib-type waveguide which includes a core layer having a sufficient width.

Next, FIG. 9 is a graph showing a relation between the optical loss and the width Wr of the core layer of the mode converter 30, where the relation is generated in the case that the waveguide mode converter 30, in which the waveguide width (width of the core layer 23 of the channel-type waveguide 51) Ww is 3.2 μm, and the height of the core layer 23 including the rib 23a is 3 μm, and the rib height is 1.20 μm to 1.30 μm, is coupled with the rib-type waveguide which includes the core layer having a sufficient width. In FIG. 9, the vertical axis indicates the optical loss in [dB], and the horizontal axis indicates the width Ww of the core layer, and marks ○, *, ×, Δ, □, and ◆ indicate cases of the rib height 1.30 μm, the rib height 1.28 μm, the rib height 1.26 μm, the rib height 1.24 μm, the rib height 1.22 μm, and the rib height 1.20 μm respectively.

By widening the waveguide width Ww in comparison with the cases shown in FIG. 7 and FIG. 8, the light which is propagated on the waveguide does not easily receive influence caused by a side wall of the waveguide, and consequently it is possible to reduce the optical loss. On the other hand, the light confinement becomes weak by widening the waveguide width Wr. As a result, a problem that it is difficult to make a bend radius of the waveguide small occurs.

However, it is possible to solve the above-mentioned problem by arranging the waveguide mode converter 30 just before a place at which the waveguide is bent, and narrowing the waveguide width Ww, and then making the bend radius of the waveguide small.

Moreover, it is possible to manufacture the polarization beam splitter 1 by use of a waveguide in which the waveguide width Ww is 3.2 μm, and the height of the core layer 23 including the rib 23a is of 3 μm. Moreover, by constituting the waveguide by use of the channel-type waveguide 51, it is possible to improve the tolerance against the manufacturing variation of the waveguide.

As shown in FIG. 9, the light confinement of the waveguide, in which the waveguide width Ww is 3.2 μm, and the height of the core layer 23 including the rib 23a is 3 μm, is weak in comparison with the light confinement of the waveguide in which the waveguide width Ww is 1.5 μm, and the height of the core layer is 1.5 μm. Therefore, it is necessary to make the width Wr of the core layer 23, which includes the tapered section 23b, equal to or longer than 9 μm. As shown in FIG. 6 and FIG. 9, from the calculation results on the optical loss which are acquired in the case that the waveguide width Wr is 3.2 μm and in the case that the waveguide width Wr is 1.5 μm, it is found that, if Wr/Ww is equal to or larger than 2.0, it is possible to sufficiently reduce the optical loss. Furthermore, it is found that, if Wr/Ww is equal to or larger than 3.0, the optical loss becomes negligibly small.

Next, a graph indicating a relation between the optical loss, and the value Ts indicating the width change of the tapered section 23b of the waveguide mode converter 30 which is coupled with the rib-type waveguide 50 including the core layer having a sufficient width, where the width Wr of the core layer 23 including the tapered section 23b is 9 μm, is shown in FIG. 10. In FIG. 10, the vertical axis indicates the optical loss in [dB], and the horizontal axis indicates the value Ts indicating the width change of the tapered section 23b, and marks ○, *, ×, △, □, and ♦ indicate cases of the rib height 1.30 μm, the rib height 1.28 μm, the rib height 1.26 μm, the rib height 1.24 μm, the rib height 1.22 μm, and the rib height 1.20 μm respectively.

As shown in FIG. 10, in comparison with the case shown in FIG. 8, a component of the input light, which leaks out into a portion of the core layer 23 other than the rib 23a, increases as the rib height becomes low. As a result, it is necessary to gradually change the width Wt of the tapered section 23b. It is found from FIG. 10 that there is no practical problem if the value Ts indicating the width change of the tapered section 23b is smaller than 0.1, and the optical loss becomes negligibly small if the value Ts is smaller than 0.05.

Moreover, by arranging the above-mentioned waveguide mode converter 30 in the transition area 43, it is possible to form the optical demultiplexer 11 and the optical multiplexer 14 by the rib-type waveguide 50, and to form the arm section 15 by the channel-type waveguide 51. As a result, it is possible to make the tolerance against the manufacturing variation or the like large. Therefore, it is possible to improve the yield and to enhance the productivity. Furthermore, it is possible to reduce a loss due to a phase error which is caused by the variation of the waveguide width. In general, if an optical circuit consists of the rib-type waveguide, an excess loss is low compared with a case that the optical circuit consists of only the channel-type waveguide. Accordingly, it can be expected that the polarization beam splitter, which is realized by a combination of the rib-type waveguide and the channel-type waveguide, has the low excessive loss in comparison with a case that a whole of the polarization beam splitter is realized by the channel-type waveguide. Furthermore, it is possible to acquire the desired waveguide length and the desired waveguide width. Accordingly, it is unnecessary to have constitution for adjusting a phase difference, and consequently it is possible to improve the productivity.

It is possible to form the rib-type waveguide 50 and the channel-type waveguide 51 with the stepper exposure method. That is, after carrying out processes of resist application, exposure, development, etching, resist exfoliation and the like, the core layer 23 including the rib 23a is formed. As a result, the EB exposure which needs a long exposure time is unnecessary, and consequently it is possible to improve the productivity. Furthermore, by carrying out the stepper exposure, it is possible to collectively form the rib-type waveguide 50 and the channel-type waveguide 51 on one substrate. Therefore, it is unnecessary to form the rib-type waveguide 50 and the channel-type waveguide 51 on different substrates respectively, and to make the substrates adhere by use of an adhesive. As a result, it is possible to make the productivity high.

Here, in order to satisfy a phase condition, the waveguide widths of the first arm waveguide 12 and the second arm waveguide 13 are different each other. For example, a waveguide width w2 of the second arm waveguide 13 is wider than a waveguide width w1 of the first arm waveguide 12. In order to widen the waveguide width at a halfway location of the second arm waveguide 13, a portion of the second arm waveguide 13 is in a tapered shape. That is, the second arm waveguide 13 includes a tapered arm waveguide 18 whose waveguide width becomes wide gradually, and a tapered arm waveguide 19 whose waveguide width becomes narrow gradually in a direction from the optical demultiplexer 11 toward the optical multiplexer 14. Similarly, the first arm waveguide 12 includes a tapered arm waveguide 18 whose waveguide width becomes wide gradually, and a tapered arm waveguide 19 whose waveguide width becomes narrow gradually in the direction from the optical demultiplexer 11 toward the optical multiplexer 14.

By making the tapered arm waveguides 18 and 19 arranged in the first arm waveguide 12 and the second arm waveguide 13 as mentioned above, it is possible to acquire the waveguide width, which satisfies the phase condition, with ease. Moreover, since the waveguide has the tapered shape, it is possible to reduce the loss, and furthermore, since it is possible to input a fundamental mode into the arm waveguides 12 and 13, each of which is a multi-mode waveguide, without bringing about unnecessary modes, it can be expected to realize the stable polarization splitting function. Moreover, the tapered arm waveguides 18 and 19, which are arranged in the second arm waveguide 13, are the same as the tapered arm waveguides 18 and 19 which are arranged in the first arm waveguide 12. It is possible to compensate a phase shift which is generated by changing the waveguide width. As a result, it is possible to realize the first arm waveguide 12 and the second arm waveguide 13, which satisfy the phase condition, with ease.

Furthermore, the waveguide in the channel-type area 42 extends straight. Portions of the first arm waveguide 12 and the second arm waveguide 13 which are formed by the channel-type waveguide 51 extend straight. Therefore, the wave guide in the channel-type area 42 has not a bending portion. By virtue of the above-mentioned constitution, it is possible to suppress a loss which may be generated at the bending portion.

The waveguide mode converter 30, which is applied to the waveguide mode converter 30, the polarization beam splitter 1 and the coherent mixer device (optical device) according to the exemplary embodiment 1 of the present invention, is the rib-type waveguide 50 which exists in the transition area 43 (connection section) of the rib-type waveguide 50 and the channel-type waveguide 51 and which includes the tapered section 23b. Moreover, the tapered section 23b is the core layer 23 which extends on both sides of the rib 23a, and the width Wt of the tapered section 23b changes gradually in the direction which is vertical to the waveguide direction.

As a result, it is possible to connect the rib-type waveguide 50 and the channel-type waveguide 51 through the waveguide mode converter 30 with suppressing the optical loss. Moreover, by combining the waveguide mode converter 30 with the Mach-Zehnder type polarization beam splitter 1, it is possible to manufacture the polarization beam splitter 1 which uses the rib-type waveguide 50 and the channel-type waveguide 51. As a result, it is possible not only to improve the yield of the polarization beam splitter 1 but also to reduce the optical loss of the polarization beam splitter 1 in comparison with a case of manufacturing the polarization beam splitter which uses only the rib-type waveguide 50 or only the channel-type waveguide 51. In other words, it is possible to provide the waveguide mode converter 30, the polarization beam splitter 1 and the coherent mixer device (optical device) in which characteristic degradation of the polarization beam splitter 1 is less.

Moreover, it is desirable that the width Wr of the core layer 23, which includes the tapered section 23b, in the direction vertical to the waveguide direction is three times as wide as or wider than the width Ww of the rib 23a. As a result, it is possible to make the optical loss negligibly small.

Here, it is assumed that the value indicating the width change of the tapered section 23b is denoted as Ts, and the width of the core layer 23, which includes the tapered section 23b, in the direction vertical to the waveguide direction is denoted as Wr, and the width of the waveguide (width of the core layer 23 of the channel-type waveguide 51) is denoted as Ww, and the value of (Wr−Ww)/Lt is denoted as Ts. In this case, it is desirable that Ts, which indicates the width change of the tapered section 23b, is smaller than 0.1. As a result, it is possible to reduce the optical loss to a range which does not cause any practical problem.

Here, while it has been explained that the waveguide is the Si waveguide, the waveguide is not limited to the Si waveguide. For example, it is possible to use a semiconductor waveguide such as InP waveguide or the like. It is possible to apply a compound semiconductor material, which includes various materials, to the waveguide.

As mentioned above, the invention according to the present application has been explained with reference to the exemplary embodiment. But, the invention according to the present application is not limited to the exemplary embodiment. Various changes, which are included in the scope of the invention according to the present application and which a person skilled in the art can understand, can be added to the constitution and the details of the invention according to the present application.

This application is based upon and claims the benefit of priority from Japanese Patent Application No. 2013-120744, filed on Jun. 7, 2013, the disclosure of which is incorporated herein in its entirety by reference.

INDUSTRIAL APPLICABILITY

It is possible to provide the waveguide mode converter, the polarization beam splitter and the optical device which make the characteristic degradation of the polarization beam splitter less.

REFERENCE SIGNS LIST 1 polarization beam splitter
11 optical demultiplexer
12 first arm waveguide
13 second arm waveguide
14 optical multiplexer
15 arm section
16 input side waveguide
17 output side waveguide
18 tapered arm waveguide
19 tapered arm waveguide
21 substrate
22 lower-layered clad layer
23 core layer
23a rib
23b tapered section
24 upper-layered clad layer
30 waveguide mode converter
41 rib-type area
42 channel-type area
43 transition area (connection section)
45 fan-in
46 fan-out
50 rib-type waveguide
51 channel-type waveguide

The invention claimed is:

1. A waveguide mode converter, wherein
the waveguide mode converter is a rib-type waveguide placed in a connection section of a rib-type waveguide and a channel-type waveguide and includes a tapered section, and wherein
a first core layer, of the rib-type waveguide, comprises a first portion and a rib projecting above the first portion,
the tapered section extends on both sides of the rib positioned between the first core layer and the channel-type waveguide, and a width of the tapered section changes in a direction which is parallel to a waveguide direction;
a height of the tapered section which is substantially equal to a height of the first portion of the first core layer,
wherein a width change of the tapered section is denoted as Ts, a width of the first core layer, including the tapered section, in a direction parallel to the waveguide direction is denoted as Wr, a width of a second core layer, of the channel-type waveguide, is denoted as Ww, a length of the tapered section is denoted as Lt, and a value of (Wr−Ww)/Lt is denoted as Ts, the value of Ts indicating that the width change of the tapered section is smaller than 0.01.

2. The waveguide mode converter of claim 1, wherein a width of the first core layer, which includes the tapered section, in the direction which is parallel to the waveguide direction is at least three times as large as a width of the rib.

3. A polarization beam splitter, comprising:
an optical demultiplexer, which is formed by a first rib-type waveguide, that splits an input light into a first input light and a second input light;
an optical multiplexer, which is formed by the first rib-type waveguide, that multiplexes the first input light and the second input light into which the optical demultiplexer splits the input light;
a first arm waveguide, which is at least partially formed by a channel-type waveguide, that guides the first input light to the optical multiplexer;
a second arm waveguide, which is at least partially formed by the channel-type waveguide that guides the second input light, which is caused a phase difference from a phase of the first input light propagated on the first arm waveguide, to the optical multiplexer;
a waveguide mode converter wherein:
the waveguide mode converter is second rib-type waveguide placed in a connection section of the first rib-type waveguide and the channel-type waveguide and includes a tapered section, and wherein a first core, layer of the second rib-type waveguide, comprises a first portion and a rib projecting above the first portion, the tapered section extends on both sides of the rib positioned between the first core layer and the channel-type waveguide, and a width of the tapered section changes in a direction which is parallel to a waveguide direction;

a height of the tapered section which is substantially equal to a height of the first portion of the first core layer, wherein a width change of the tapered section is denoted as Ts, a width of the first core layer, including the tapered section, in a direction parallel to the waveguide direction is denoted as Wr, a width of a second core layer, of the channel-type waveguide, is denoted as Ww, a length of the tapered section is denoted as Lt, and a value of (Wr−Ww)/Lt is denoted as Ts, the value of Ts indicating that the width change of the tapered section is smaller than 0.01.

4. An optical device, comprising:

a plurality of polarization beam splitters connected in a form of multi-step, a polarization beam splitter comprising:

an optical demultiplexer which is formed by a first rib-type waveguide, and splits an input light into a first input light and a second input light;

an optical multiplexer which is formed by the first rib-type waveguide and multiplexes the first input light and the second input light into which the optical demultiplexer splits the input light;

a first arm waveguide which is formed by a channel-type waveguide at least partially and guides the first input light to the optical multiplexer; and a second arm waveguide which is formed by the channel-type waveguide at least partially, and guides the second input light, which is caused a phase difference from a phase of the first input light propagated on the first arm waveguide, to the optical multiplexer;

a waveguide mode converter wherein:

the waveguide mode converter is a second rib-type waveguide placed in a connection section of the first rib-type waveguide and the channel-type waveguide and includes a tapered section, and wherein a first core layer of the second rib-type waveguide comprises a first portion and a rib projecting above the first portion, the tapered section extends on both sides of the rib positioned between the first core layer and the channel-type waveguide, and a width of the tapered section changes in a direction which is parallel to a waveguide direction;

a height of the tapered section which is substantially equal to a height of the first portion of the first core layer, wherein a width change of the tapered section is denoted as Ts, a width of the first core layer, including the tapered section, in a direction parallel to the waveguide direction is denoted as Wr, a width of a second core layer of the channel-type waveguide is denoted as Ww, a length of the tapered section is denoted as Lt, and a value of (Wr−Ww)/Lt is denoted as Ts, the value of Ts indicating that the width change of the tapered section is smaller than 0.01.

5. A waveguide apparatus, comprising:

a first rib-type waveguide having a first core layer, wherein the first core layer includes a first portion and a rib projecting above the first portion;

a channel-type waveguide;

a connection section, of the first rib-type waveguide, and the channel-type waveguide; and a waveguide converter, of a second rib-type waveguide, placed in the connection section, the waveguide converter having:

a tapered section that extends on both sides of the rib positions between the first core layer and the channel-type waveguide, wherein a width of the tapered section changes in a direction which is parallel to a waveguide direction, where the change in the width is denoted as Ts;

wherein a height of the tapered section is substantially equal to a height of the first portion of the first core layer, wherein the width of the first core layer, including the tapered section, in a direction parallel to the waveguide direction, is denoted as Wr, wherein a width of a second core layer of the channel-type waveguide is denoted as Ww, wherein a length of the tapered section is denoted as Lt, and wherein a value of (Wr−Ww)/Lt is denoted as Ts, the value of Ts indicating that the width change of the tapered section is smaller than 0.01.

6. The waveguide mode converter of claim 5, wherein a width of the first core layer, which includes the tapered section, in the direction which is parallel to the waveguide direction is at least three times as large as a width of the rib.

* * * * *

UNITED STATES PATENT AND TRADEMARK OFFICE
CERTIFICATE OF CORRECTION

| | | |
|---|---|---|
| PATENT NO. | : 9,690,044 B2 | |
| APPLICATION NO. | : 14/895612 | |
| DATED | : June 27, 2017 | |
| INVENTOR(S) | : Takashi Matsumoto et al. | |

It is certified that error appears in the above-identified patent and that said Letters Patent is hereby corrected as shown below:

In the Claims

Claim 3, Column 12, Line 62, "which is caused a phase difference" should read -- which is caused by a phase difference --.

Claim 3, Column 12, Line 66, "mode converter is second rib-type" should read -- mode converter is a second rib-type --.

Claim 4, Column 13, Line 40, "which is caused a phase difference" should read -- which is caused by a phase difference --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*